March 22, 1932.   K. T. NORRIS   1,850,471
AUTOMOBILE LICENSE CERTIFICATE HOLDER
Filed July 3, 1931
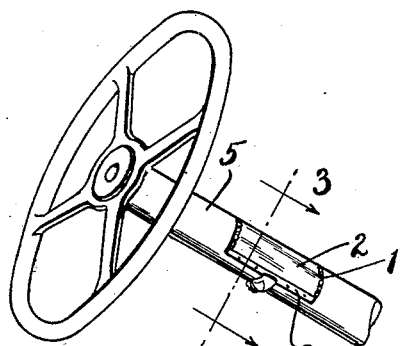
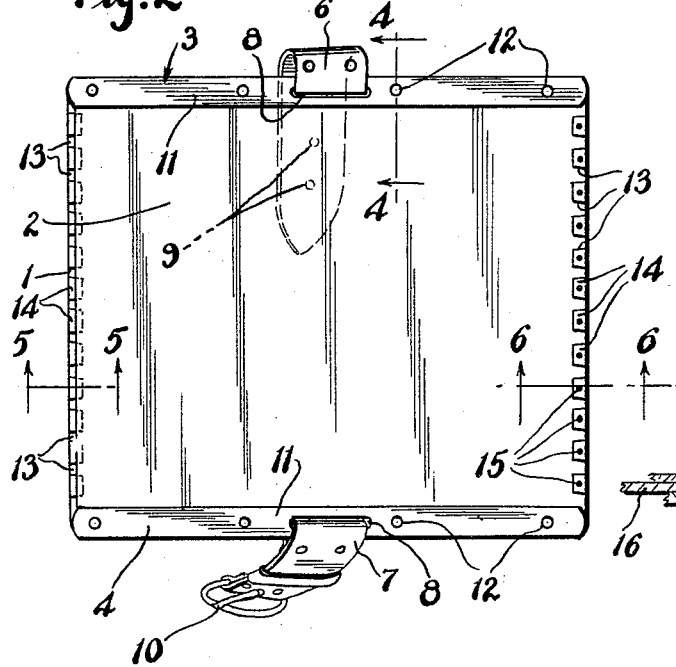
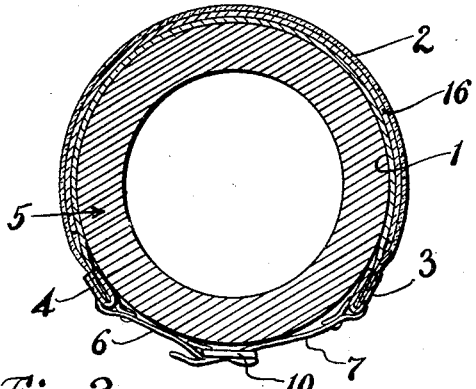
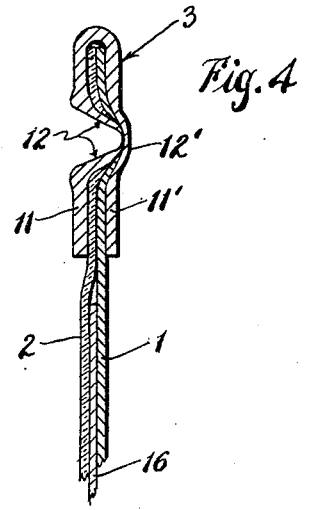
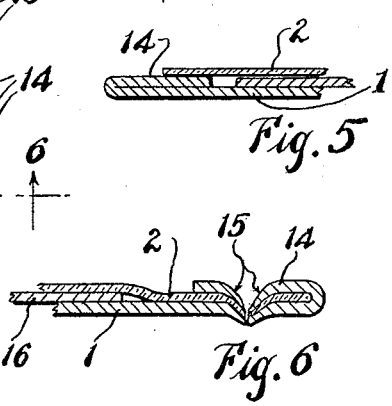
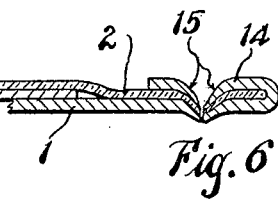
INVENTOR.
Kenneth T. Norris
BY
ATTORNEYS.

Patented Mar. 22, 1932

1,850,471

UNITED STATES PATENT OFFICE

KENNETH T. NORRIS, OF LOS ANGELES, CALIFORNIA

AUTOMOBILE LICENSE CERTIFICATE HOLDER

Application filed July 3, 1931. Serial No. 548,499.

This invention relates to and has for an object the provision of an improved type of license certificate holder adapted to be applied to the steering column of an automobile and formed entirely of metal so as to be practically indestructible and yet sufficiently flexible to readily conform itself to the periphery of the steering column whereby it may be mounted in a conspicuous position on the automobile.

An object of this invention is to provide an all metal certificate holder formed of thin flexible sheet metal reinforced at the opposite ends to provide rigidity, and also reinforced at its opposite sides in such a manner that the edges will be blunt and yet will permit the flexing or bending of the metal for mounting it in position for use.

Other objects may appear as the description progresses.

In the accompanying drawings I have shown a preferred form of invention, subject to modification within the scope of the appended claims without departing from the spirit thereof. In said drawings, Fig. 1 is a perspective view of a steering wheel and column showing my improved certificate holder mounted thereon.

Fig. 2 is a top plan view of the holder extended flatwise into position for inserting or removing a certificate.

Fig. 3 is a section of the steering column on line 3—3 of Fig. 1 showing the holder supported thereon.

Figs. 4, 5 and 6 are, respectively, fragmentary sections on lines 4—4, 5—5 and 6—6 of Fig. 2.

In the consideration of this invention it will be understood that certificate holders as heretofore usually provided are formed of imitation leather or other suitable flexible material which wears rapidly and becomes unsightly, and are not sufficiently durable and strong to protect the certificate held therein. Of necessity a device of this character must be of maximum simplicity, extremely cheap as to cost, and yet sufficiently strong and durable to properly support and expose the certificate at all times.

I therefore provide a holder which is formed of a single sheet of metal 1 forming a base and body which is overlaid with a sheet 2 of transparent material such as celluloid and held at the opposite ends on the body 1 by means of channeled reinforcing members 3 and 4.

Any suitable device may be employed for connecting the end members 3 and 4 together when the holder is mounted on the steering column 5 of an automobile. For this purpose I prefer to use straps 6 and 7 attached respectively to the members 3 and 4 by extending the straps thru slots, as at 8, formed in said members. The strap 6 has perforations 9 formed therein adapted to be engaged by a buckle 10 on the other strap 7.

As shown in Fig. 4 the members 3 and 4 are of U-shaped cross section and have portions 11 and 11' which underlie the body 1 and overlie the transparent sheet 2.

When the members 3 and 4 are applied over the overlapped edges of the body 1 and the transparent member 2, a suitable indenting tool is employed for deforming the opposite portions 11 and 11' of the members 3 and 4 and the body 1 and the transparent sheet 2, whereby indentations as at 12, are made, causing the metal from the portion 11, for instance, of the member 3 to be depressed downwardly thru the members 1 and 2 into a slight indentation 12' in the portion 11', thereby inter-locking the members 1, 2 and 3 together without actually requiring rivets to hold said members together.

The metal body 1 being very thin is knife-like on its edges, and in order to render the edges blunt and at the same time to permit the body 1 to be readily bent around the steering column 5, the body member 1 is notched as at 13 at a plurality of points along the edges intermediate the members 3 and 4, thus forming a series of narrow lips 14, 14 etc. on the opposite side edges of the body 1. In a forming operation the lips 14, 14 etc. are bent inwardly over the upper surface of the body 1, and at the right hand side of the body, as seen in Fig. 2, said lips overlie the transparent sheet of material 2 and are indented at points 15, 15 etc. and deformed so as to permanently lock the sheet 2 on the body at an edge thereof.

On the left hand side of the device, as shown in Fig. 2, the lips 14 are formed as shown in Fig. 5 so that the corresponding edge of the transparent sheet 2 will overlie the lips 14. Thus a certificate, as at 16, may be inserted in the holder from the left hand side, as seen in Fig. 2, right side up between the body 1 and the transparent sheet 2 in order that the body of the certificate may be clearly visible thru the sheet 2.

The lips 14 at the sides of the body being bent upwardly and thence downwardly into close contact with the body serve to render the edges of the body blunt and the notches therebetween permit the flexing of the body in order that it may be bent around the steering post 5.

The holder shown and described herein is so designed and constructed that it may be economically and rapidly made in an automatic press so as to meet all the requirements of use and at the same time may be supplied at a minimum expense to the user.

What I claim is:

1. A holder of the character described comprising a flexible sheet metal body, a transparent sheet of material overlying said body and attached to the body at its opposite ends and one of its sides for supporting a certificate or the like in exposed position between the body and the transparent sheet of material, the opposite sides of the body being each provided with a plurality of spaced portions bent over the body, said portions at one side of the body underlying the transparent sheet of material and corresponding portions at the other side of the body overlying the transparent material, and deformed to secure the corresponding edge of the transparent material to the body.

2. A holder of the character described comprising a flexible sheet metal body, a transparent sheet of material overlying said body and attached to the body at its opposite ends and one of its sides for supporting a certificate or the like in exposed position between the body and the transparent sheet of material, a side of said body being provided with a plurality of spaced portions bent downwardly and overlying the corresponding edge of said transparent sheet of material, and deformed so as to interlock with the body and the transparent sheet of material.

3. A holder of the character described comprising a flexible sheet metal body, a transparent sheet of material overlying said body and attached to the body at its opposite ends and one of its sides for supporting a certificate or the like in exposed position between the body and the transparent sheet of material, said transparent sheet of material being detached from the body at its opposite side to provide an opening for the insertion of a certificate or the like between the body and the transparent sheet of material, and a plurality of spaced portions formed integral with the body and bent downwardly over the upper side of the body at the open side of the holder and underlying the transparent sheet of material.

4. A holder for certificates and the like comprising a body formed of flexible sheet metal, a flexible sheet of transparent material superposed thereon, and channel members at the ends of the holder underlying the body and overlying the transparent sheet of material, said channel members being deformed and indented for securing the body, the transparent member and the channel members together.

5. A holder for certificates as characterized in claim 4, including means attached to the channel members for detachably supporting the holder in position for use.

6. A holder for certificates and the like comprising a body formed of flexible sheet metal, a flexible sheet of transparent material superposed thereon, and channel members at the ends of the holder underlying the body and overlying the transparent sheet of material, said channel members being deformed and indented for securing the body, the transparent member and the channel members together, said body formed with a plurality of spaced portions at a side edge thereof overlying the transparent member, and deformed for securing the transparent member to the body at a plurality of points.

7. A holder for certificates and the like comprising a body formed of flexible sheet metal, a flexible sheet of transparent material superposed thereon, and channel members at the ends of the holder underlying the body and overlying the transparent sheet of material, said channel members being deformed and indented for securing the body, the transparent member and the channel members together, said body formed with a plurality of spaced portions at a side edge thereof overlying the transparent member and deformed for securing the transparent member to the body at a plurality of points, the transparent member being detached from the body at its opposite side edge, and the body being provided thereat with a plurality of spaced portions overlying the body and underlying the transparent member, for the purpose described.

8. A holder of the character described comprising a flexible sheet metal body, a transparent sheet of material superposed thereon and attached to the body at its opposite ends, one of the sides of said body being formed of a plurality of spaced portions bent downwardly over and secured to the adjacent edge of the transparent sheet of material for securing the transparent sheet of material to the body, the other side of the transparent sheet of material being detached from the body to permit the insertion of a certificate or the like in the holder and the removal of the same therefrom.

9. A holder of the character described comprising a flexible sheet metal body, a transparent sheet of material superposed thereon and attached to the body at its opposite ends, one of the sides of said body being formed of a plurality of spaced portions bent downwardly over and secured to the adjacent edge of the transparent sheet of material for securing the transparent sheet of material to the body, the other side of the transparent sheet of material being detached from the body to permit the insertion of a certificate or the like in the holder and the removal of the same therefrom, said holder being adapted to be bent around and supported on a circular supporting member, and attaching means on the holder for supporting the same in position on the supporting member.

10. A holder of the character described comprising a flexible sheet metal body, a transparent sheet of material overlying said body and attached to the body at its opposite ends for supporting a certificate or the like in exposed position between the body and the transparent sheet of material, the opposite sides of the body being each provided with a plurality of spaced portions bent over the body, said portions at one side of the body overlying the transparent material, and deformed to secure the corresponding edge of the transparent material to the body.

11. A holder for certificates and the like comprising a body formed of flexible sheet metal, a flexible sheet of transparent material superposed thereon, and channel members at the ends of the holder underlying the body and overlying the transparent sheet of material, said channel members securing the body and the transparent member together.

12. A holder for certificates as characterized in claim 11, including means attached to the channel members for detachably supporting the holder in position for use.

13. A holder for certificates and the like comprising a body formed of flexible sheet metal, a flexible sheet of transparent material superposed thereon, and channel members at the ends of the holder underlying the body and overlying the transparent sheet of material, said channel members being secured to the body, said body formed with a plurality of spaced portions at a side edge thereof overlying the transparent member, for securing the transparent member to the body at a plurality of points.

KENNETH T. NORRIS.